US012798795B2

(12) United States Patent
Yan et al.

(10) Patent No.: US 12,798,795 B2
(45) Date of Patent: Nov. 17, 2026

(54) SMA WIRE-DRIVEN REUSABLE RELEASE MECHANISM HAVING SELF-RESETTING FUNCTION

(71) Applicant: Beijing University Of Aeronautics And Astronautics, Beijing (CN)

(72) Inventors: Xiaojun Yan, Beijing (CN); Jiaming Leng, Beijing (CN); Lei Qu, Beijing (CN); Xiaoyuan Wang, Beijing (CN); Zhiwei Liu, Beijing (CN); Weifeng Wan, Beijing (CN); Huimin Li, Beijing (CN)

(73) Assignee: Beijing University Of Aeronautics And Astronautics, Beijing (CN)

( * ) Notice: Subject to any disclaimer, the term of this patent is extended or adjusted under 35 U.S.C. 154(b) by 182 days.

(21) Appl. No.: 18/904,034

(22) Filed: Oct. 1, 2024

(65) Prior Publication Data

US 2025/0019093 A1 Jan. 16, 2025

Related U.S. Application Data

(63) Continuation of application No. PCT/CN2022/123823, filed on Oct. 8, 2022.

(30) Foreign Application Priority Data

Sep. 21, 2022 (CN) ........................ 202211151778.3

(51) Int. Cl.
*B64G 1/22* (2006.01)
*B64G 1/64* (2006.01)

(52) U.S. Cl.
CPC ................. *B64G 1/22* (2013.01); *B64G 1/64* (2013.01); *B64G 1/6457* (2023.08)

(58) Field of Classification Search
CPC ........ B64G 1/6457; B64G 1/645; B64G 1/64; B64G 1/641
See application file for complete search history.

(56) References Cited

U.S. PATENT DOCUMENTS 5,603,595 A * 2/1997 Nygren, Jr. .......... B64G 1/2228 411/6
6,769,830 B1 * 8/2004 Nygren .................. B64G 1/641 29/446

(Continued)

FOREIGN PATENT DOCUMENTS

CN 101665156 A 3/2010
CN 108190051 A 6/2018

(Continued)

*Primary Examiner* — Arfan Y. Sinaki
(74) *Attorney, Agent, or Firm* — Nitin Kaushik

(57) ABSTRACT

A shape memory alloy (SMA) wire-driven reusable release mechanism having a self-resetting function includes a structure of two-stage load reduction and one-stage release. In a first-stage load reduction, a compression rod cooperates with a hoop petal through inclined surfaces, and an inclined block cooperates with a shell or a sliding block through inclined surfaces. In a second-stage load reduction, balls in a thrust bearing are coated with a molybdenum disulfide lubricating coating. In a first-stage release, a driving shaft drives the thrust bearing to rotate by an angle, causing an upper ring of the thrust bearing to descend to release an axial clearance.

9 Claims, 13 Drawing Sheets

(56) References Cited

U.S. PATENT DOCUMENTS

| | | | | |
|---|---|---|---|---|
| 11,466,721 | B1 * | 10/2022 | Houghton ............ | B64G 1/6455 |
| 2002/0102130 | A1 * | 8/2002 | Nygren ................. | F16B 5/0208<br>403/337 |

FOREIGN PATENT DOCUMENTS

| | | | | | |
|---|---|---|---|---|---|
| CN | 109774985 | A | | 5/2019 | |
| CN | 111483620 | A | * | 8/2020 | ............. B64G 1/645 |
| CN | 113830329 | A | | 12/2021 | |

* cited by examiner (a) (b)

SMA WIRE-DRIVEN REUSABLE RELEASE MECHANISM HAVING SELF-RESETTING FUNCTION

CROSS-REFERENCE TO RELATED APPLICATIONS

The application claims priority to Chinese patent application No. 202211151778.3, filed on Sep. 21, 2022, the entire contents of which are incorporated herein by reference.

TECHNICAL FIELD

The present invention relates to the technical field of spacecraft connection-separation mechanisms, and particularly an SMA wire-driven reusable release mechanism having a self-resetting function.

BACKGROUND

A spacecraft requires multiple connection and separation mechanisms to achieve space connection and unlocking functions, such as separation of multi-stage launch vehicles, and deployment of solar wings on satellites or spacecrafts. At present, such unlocking devices are mostly initiating explosive device bolts (also known as explosive bolts). With the development of an aerospace technology, especially the emergence of new-generation small satellites, impact and pollution problems caused by initiating explosive devices are becoming increasingly serious. One of the main focuses to solve the problems is to develop a novel space unlocking mechanism using shape memory alloys (SMA).

There has been some progress in the development of novel non-initiating explosive device unlocking mechanisms domestically and internationally, and various SMA-driven design schemes have been proposed, such as a design scheme using SMA columns as drive proposed by Hi Shear Technology Company in the United States, and the "SMA WIRE-DRIVEN CONNECTION AND UNLOCKING MECHANISM" proposed domestically (patent application number: 200810119580.0). The "SMA WIRE-DRIVEN CONNECTION AND UNLOCKING MECHANISM" uses an SMA wire as a driving element, the structure is shown as FIG. 1, and the mechanism consists of an insulated bearing 1, a ceramic support 2, a hoop drum 3, a shell 4, an insulated pulley 5, a split nut 6, a bolt 7, an end cover 8, a separation spring 9, a separation top block 10, an SMA wire 11, and a reset spring 12. The upper end surface and the lower end surface of the split nut 6 both cooperate with the end cover 8 and the top block 10 respectively with conical surfaces, forming a complete threaded pair. The bolt 7 is screwed into the split nut 6. The upper end of the hoop drum 3 cooperates with the end cover 8, and the lower end is tightened by the pre-compressed reset spring 12. The pre-stretched SMA wire 11 goes around the pulley 5 and the insulated bearing 1, and two ends are fixed to the ceramic support 2 and the hoop drum 3, respectively. The state shown in FIG. 1 is an unlocking process. The SMA wire 11 is electrified for heating, the SMA wire 11 contracts, and the hoop drum 3 is pulled to move downwards while the reset spring 12 is compressed. When the hoop drum 3 moves to a certain position, a protrusion on the split nut 6 slides into a groove of the hoop drum 3 under the action of the separation spring 9, which breaks the threaded pair, thereby enabling the bolt 7 to detach from the split nut 6, to achieve a separation function of the mechanism. After electrifying ends, the temperature decreases, and low-temperature restoring force of the SMA wire 11 is less than the thrust of the reset spring 12. Under the action of the reset spring 12, the hoop drum 3 moves upward, re-stretches the SMA wire 11, and refolds the split nut 6 again, thereby achieving a repeatable actuation function of the mechanism.

The "SMA WIRE-DRIVEN CONNECTION AND UNLOCKING MECHANISM" has the advantages of large margin, good synchronization, etc., but also has fatal disadvantages: during a release process of the mechanism, sliding friction exists between the split nut and the hoop drum; when release load is large, the frictional resistance is also large, which affects the driving process of the SMA wire, the success rate of release is reduced, and reliability is reduced, thereby limiting the use of the release load.

SUMMARY

In view of this, the present invention provides an SMA wire-driven reusable release mechanism having a self-resetting function, which is large in release load, can realize automatic reset, and is strong in impact resistance, and high in reliability.

The SMA wire-driven reusable release mechanism having a self-resetting function, provided in the present invention internally and sequentially includes an SMA driver assembly, a thrust bearing assembly, a tray assembly, and a separation assembly from bottom to top, and external encapsulating of the mechanism is realized by a shell and a bottom cover, where

- the SMA driver assembly includes an SMA wire, a driving shaft, a reset spring, and a support frame; the driving shaft is mounted on the support frame; the SMA wire is wrapped around the driving shaft, and two ends are fixed to the support frame; the reset spring is mounted on a tray nut, and the other end is mounted on the driving shaft;
- the thrust bearing assembly is pressed onto the support frame, is of a double-column structure, and sequentially includes an upper ring, an upper row of balls, an upper cage, a middle ring, a lower cage, a lower row of balls, and a lower ring; pits are formed in the raceway of the middle ring in the thrust bearing assembly and are evenly spaced from the raceway; the middle ring is fixedly connected to the driving shaft;
- the tray assembly includes a tray, a tray spring, a tray shaft, a tray bracket, and the tray nut, where the tray bracket is mounted on the support frame; the tray is mounted on the tray bracket through the tray shaft and the tray nut; the tray spring is wrapped around the tray shaft and located between the tray and the tray bracket;
- the separation assembly includes a compression rod, a hoop petal, an inclined block and a sliding block, where a protrusion is arranged at one end of the compression rod, and the protrusion of the compression rod is inserted into the hoop petal and surrounded by the hoop petal; the upper end and the lower end of the hoop petal are respectively in contact with the shell and the tray; the inclined block is located between the hoop petal and the sliding block and moves up and down along an inclined surface; and the hoop petal and the inclined block are alternatively provided with grooves in a contact surface.

In the present invention, the separation assembly forms a load reduction structure through cooperation with multiple inclined surfaces. Load reduction is performed on the load borne by the compression rod by means of two-stage inclined surfaces, namely a cooperation inclined surface of the compression rod and the hoop petal as well as the cooperation inclined surface of the inclined block and the sliding block. Most of the load is borne by the shell, and only a small part of the load acts on the thrust bearing. Such design can significantly increase locking load. The separation assembly adopts a locking manner of enclasping the compression rod by the hoop petal, which achieves unlocking and automatic reset through movement of the inclined block and the sliding block. When re-locking is needed, the inclined block and the sliding block remain stationary. By moving the hoop petal downwards, the hoop petal moves outwards along the inclined surface that cooperates with the inclined block, allowing the compression rod to slide in. As the compression rod slides in, the pressure of the compression rod on the hoop petal disappears, and the hoop petal moves upwards under the action of the tray spring to enclasp the compression rod. This structure can achieve quick mounting and automatic reset.

In the SMA driver assembly, the driving shaft can rotate in the groove of the support frame, the SMA wire is electrified for heating, and the SMA wire contracts to drive the driving shaft to rotate. When the SMA wire cools, under the action of the reset spring, the driving shaft resets, and besides, the SMA wire is stretched for the next driving. The use of the structure can convert linear motion of the SMA wire into rotating motion, which can be used to drive the rotation of the middle ring of the thrust bearing.

When the thrust bearing assembly is in a locking state, the balls fall into the raceway. When unlocking is needed, the driving shaft drives the middle ring of the thrust bearing to rotate by a certain angle, and the balls fall into the pits to enable the upper ring to descend by a certain displacement, which in turn causes the sliding block to descend by a certain displacement, thereby achieving release. After the SMA wire cools, under the action of the reset spring, the driving shaft drives the middle ring of the thrust bearing to move, so as to enable the balls to return to the raceway of the middle ring, thereby achieving reset. Release and reset are easy to realize by means of the structure.

A working process:

when the mechanism is unlocked, the SMA wire is electrified for heating to contract so as to drive the driving shaft to rotate. The driving shaft drives the middle ring of the thrust bearing to rotate, and the balls fall into the preset pits in the raceway, thereby releasing a certain axial clearance. Under the action of pressure, the sliding block moves downwards, the inclined block radially moves outwards, and the hoop petal opens to release the compression rod.

When the mechanism automatically resets, after the SMA wire cools, the driving shaft resets under the action of the reset spring. The driving shaft drives the middle ring of the thrust bearing to rotate by a certain angle, and the balls slide from the pits into the raceway, thereby eliminating axial clearance. The sliding block moves upwards, the inclined block moves radially inwards, and the hoop petal radially moves inwards to reset.

When the compression rod is inserted for repeated locking, under the action of pressure, the hoop petal compresses the tray spring by means of the tray. After the hoop petal moves downwards, radial limit of the hoop petal and the inclined block is eliminated, and the hoop petal is opened. With the sliding in of the compression rod, the pressure borne by the hoop petal is eliminated. Under the action of the tray spring, the hoop petal resets and enclasps the compression rod, thereby achieving locking.

Preferably, the thrust bearing assembly is of a double-column structure, and sequentially includes an upper ring, an upper row of balls, an upper cage, a middle ring, a lower cage, a lower row of balls, and a lower ring from top to bottom, where the lower ring of the thrust bearing is pressed onto the support frame, and the middle ring is connected to the driving shaft; and pits are formed in the raceway of the middle ring and are evenly spaced from the raceway.

Preferably, balls in the thrust bearing assembly are coated with a molybdenum disulfide lubricating coating, which can effectively reduce friction so as to reduce a torque transmitted to a driving shaft, thereby effectively bearing axial loads.

Preferably, the separation assembly further includes a sliding block, the sliding block is mounted on an upper end surface of the thrust bearing assembly, the sliding block is provided with an inclined surface which cooperates with the inclined block, and the inclined block slides up and down along the inclined surface of the sliding block.

Preferably, an inner hexagonal groove is processed in the bottom of the driving shaft, a circular hole is processed in a center of the bottom of the bottom cover, such that an inner hexagonal wrench can enter from the circular hole, so as to rotate the driving shaft, thereby realizing manual unlocking and resetting; and by means of such design, unlocking and resetting can be conveniently performed without power supply.

Preferably, a square groove is processed in the side surface of a base, the protrusion is processed in the side surface of the upper cage and clamped into the square groove in the base, the upper cage can be rotated by means of the protrusion, and under the condition that the SMA driver assembly is not influenced, manual unlocking and resetting can be realized.

BENEFICIAL EFFECTS the present invention can effectively solve the problems of low impact resistance, small release load, difficult reset, low reliability, etc. of existing locking and release mechanisms, can achieve automatic reset, has the characteristics of large release load, strong vibration resistance and impact resistance, and is specifically manifested in the following aspects:

(1) the present invention adopts a structure of two-stage load reduction and one-stage release. First-stage load reduction: a compression rod and a hoop petal, as well as an inclined block and a sliding block, all cooperate with each other by means of inclined surfaces, which can effectively transfer most of tension load of the compression rod to the shell, leaving only a small part of the load transmitted to a thrust bearing. Second-state load reduction: balls in the thrust bearing are coated with a molybdenum disulfide lubricating coating, which can effectively reduce friction so as to reduce a torque transmitted to a driving shaft, thereby effectively bearing axial loads. First-stage release: the driving shaft drives a middle ring of a thrust bearing to rotate by a certain angle, causing an upper ring of the thrust bearing to descend to release a certain axial clearance. The structure can significantly improve load-bearing capacity of the mechanism and improve release reliability.

(2) The repeated locking and release assembly in the present invention adopts an automatic reset manner. After the SMA wire is electrified for heating to release, as the SMA wire cools, the restoring force of the reset spring is greater than tension of the SMA wire. The reset spring drives the driving shaft to rotate, such that the balls move from the pits in the middle ring of the thrust bearing to the raceway, thereby eliminating axial clearance and achieving automatic reset. The method avoids repeated mounting of the release structure and is convenient to use.

(3) The present invention adopts a mounting manner of quick insertion of the compression rod. When relocking is needed, the compression rod is inserted from the release structure, and the hoop petal moves downwards with the compression rod, while moving outwards along a cooperation surface with the inclined block, such that the compression rod can slide into the groove of the hoop petal. With the sliding of the compression rod, the hoop petal moves upwards under the action of the tray spring, thereby re-enclasping the compression rod. This design greatly simplifies the mounting process of the compression rod, enabling the mechanism to be used for repeated locking of spacecrafts in orbit.

(4) The present invention adopts the manner of driving the shaft to rotate for releasing. Through the design of winding the SMA wire on a pulley and the driving shaft, when the SMA wire contracts, the driving shaft is driven to rotate, thereby converting linear motion into rotating motion, greatly saving the space and weight of the mechanism.

(5) The present invention adopts two sets of SMA wire driving devices to achieve redundant design, which can successfully unlock even if one set of SMA wires fails, thereby improving the reliability of release.

Where, 1—shell; 2—compression rod; 3—hoop petal; 4—inclined block; 5—sliding block; 6—tray; 7—tray spring; 8—tray shaft; 9—tray bracket; 10—tray nut; 11—reset spring; 12—driving shaft; 13—SMA wire; 14—support frame; 15—upper ring of thrust bearing; 16—upper row of balls; 17—upper cage; 18—middle ring of thrust bearing; 19—lower cage; 20—lower row of balls; 21—lower ring of thrust bearing; 22—bottom cover.

DETAILED DESCRIPTION OF THE EMBODIMENTS

The present invention is described in detail below with reference to the accompanying drawings and embodiments.

Figure 3:
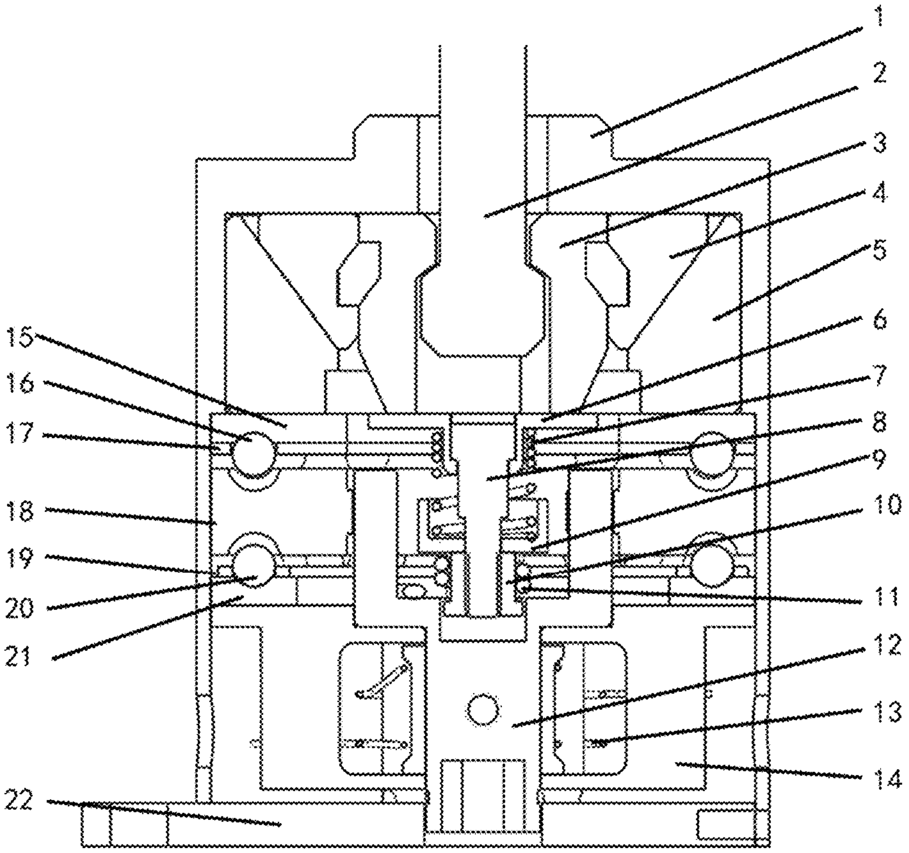
FIG. 3 shows a schematic structural diagram of the release mechanism of the present invention.

The specific structure of the present invention is shown in FIG. 3, and a releaser can be divided into four assemblies: an SMA driver assembly, a thrust bearing assembly, a tray assembly, and a separation assembly. Where, the SMA driver assembly consists of the SMA wire 13, the support frame 14, the driving shaft 12, and the reset spring 11, the thrust bearing assembly consists of an upper ring 15 of a thrust bearing, an upper row of balls 16, an upper cage 17, a middle ring 18 of the thrust bearing, a lower cage 19, a lower row of balls 20, and a lower ring 21 of the thrust bearing; the tray assembly consists of a tray 6, a tray spring 7, a tray shaft 8, a tray bracket 9, and a tray nut 10; the separation assembly consists of a compression rod 2, a hoop petal 3, an inclined block 4, and a sliding block 5; and the outer part of the mechanism is enclosed by a shell 1 and a bottom cover 22.

As shown in FIG. 3, the SMA wire 13 goes around the driving shaft 12 which is assembled in the groove of the support frame and can rotate by a certain angle. The support frame 14 is assembled on the bottom cover 22. Besides, the structure of the thrust bearing is shown as FIG. 4, and the thrust bearing consists of the upper ring 15 of the thrust bearing, the upper row of balls 16, the upper cage 17, the middle ring 18 of the thrust bearing, the lower cage 19, the lower row of balls 20, and the lower ring 21 from top to bottom; and the lower ring of the thrust bearing is pressed onto the support frame 14, and the driving shaft 12 is connected to the middle ring 18 of the thrust bearing, which can drive the middle ring of the thrust bearing to rotate. At the same time, the tray bracket 9 is also mounted on support frame 14 through screws, the tray shaft 8 is mounted on the tray bracket 9 through the tray nut 10, the reset spring 11 is mounted on tray nut 10, and the other end is mounted on driving shaft 12 for resetting the driving shaft 12. One end of the tray spring 7 is pressed onto the tray bracket 9, and the other end is pressed onto the tray 6. The separation assembly is mounted on the upper ring 15 of the thrust bearing.

Figure 1:
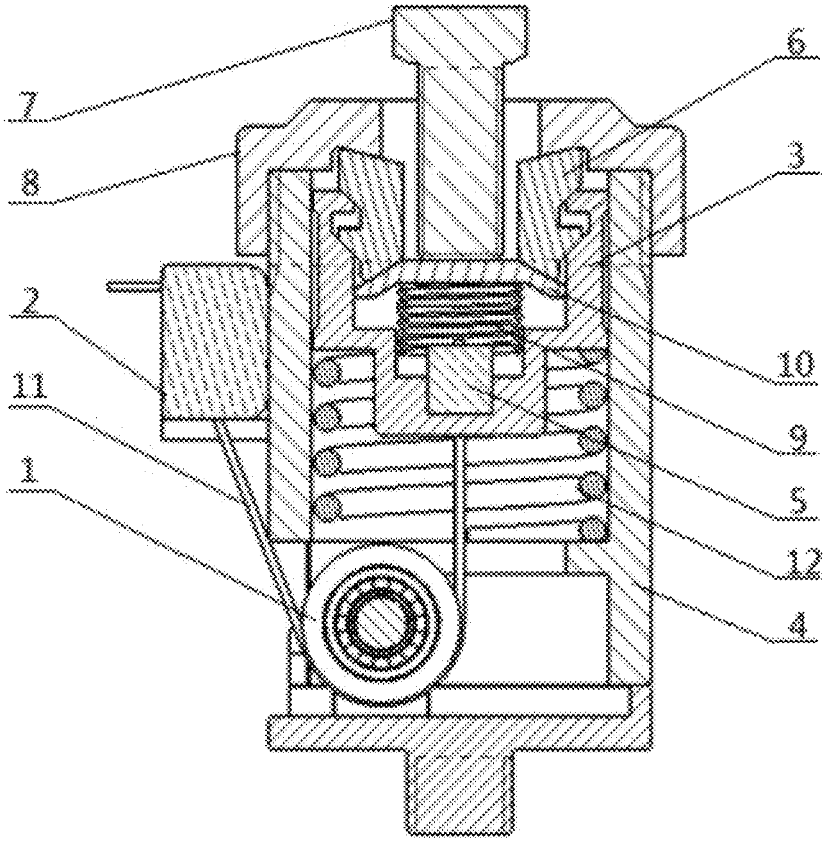
FIG. 1 (Prior Art)
FIG. 1 shows a schematic structural diagram of the existing SMA wire-driven connection and unlocking mechanism.
Figure 2:
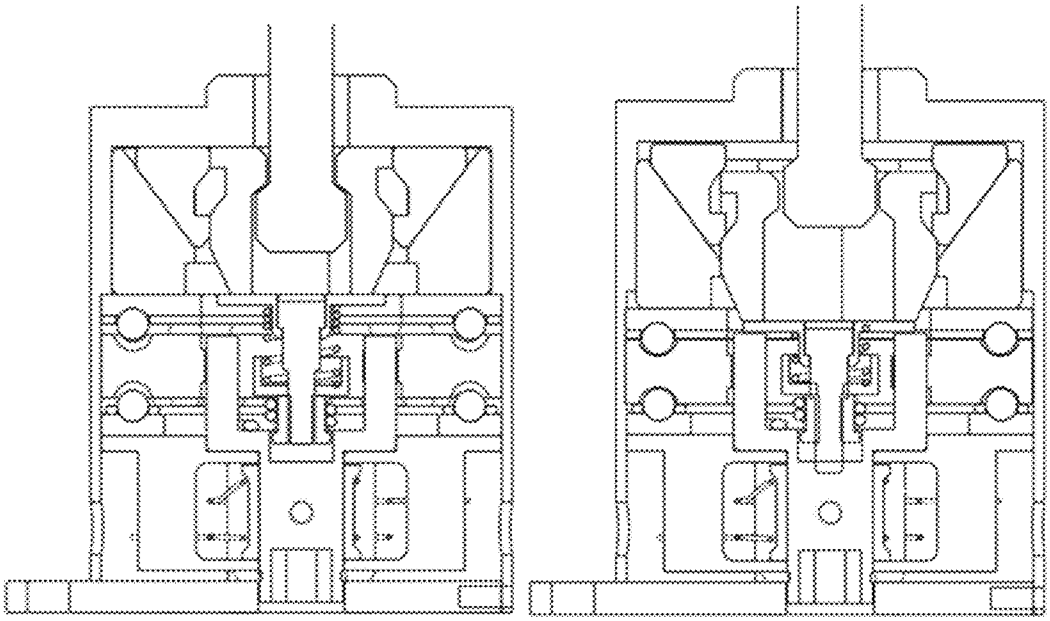
FIG. 2 shows a schematic diagram of a state of a release mechanism of the present invention, where (a) is in a locking state and (b) is in an unlocking process state.

The locking state of a self-resetting releaser is shown as FIG. 2 (*a*). When unlocking is needed, the SMA wire 13 is electrified for heating, such that the SMA wire 13 contracts to drive the driving shaft 12 to rotate, and the driving shaft 12 drives the middle ring 18 of the thrust bearing to rotate. The upper row of balls 16 and the lower row of balls 20 fall into the deep groove 18-I of the middle ring 18 of the thrust bearing, and the upper ring 15 of the thrust bearing descends by a certain displacement, as shown in FIG. 2 (*b*). Then, the sliding block 5 descends by a certain displacement under the pressure of the inclined block 4, and the inclined block 4 moves radially outwards under the action of the hoop petal 3. The constraint of the hoop petal 3 on the compression rod 2 is released, and the compression rod 2 is separated under tension. After the SMA wire 13 cools, the tension of the SMA wire decreases. Under the action of the reset spring 11, the driving shaft 12 resets, and at the same time, the middle ring 18 of the thrust bearing is driven to reset. The upper row of balls 16 and the lower row of balls 20 move from the deep groove 18-I of the middle ring 17 of the thrust bearing to the shallow groove 18-II. The upper ring 15 of the thrust bearing moves upwards along with the upper row of balls and the lower row of balls, and the sliding block 5 moves upwards accordingly. The inclined block 4 moves radially inwards, and the hoop petal 3 resets.

The process of locking the compression rod of the self-resetting releaser is a reverse process of the unlocking process, as shown in FIG. 2 (*b*) to FIG. 2 (*a*). The compression rod 2 is inserted into the mechanism, and under the action of the compression rod 2, the hoop petal 3 moves downwards along with the compression rod 2, while the tray spring 7 is compressed through the tray 6. Due to the cooperation of the grooves, the radial constraint of the inclined block 4 on the hoop petal 3 disappears, and the hoop petal 3 moves to two sides. The pressure of the compression rod 2 on the hoop petal 3 disappears. Under the action of the tray 6, the hoop petal 3 moves upwards and inwards simultaneously, the compression rod 2 is enclasped, thereby achieving locking.

Figure 4:
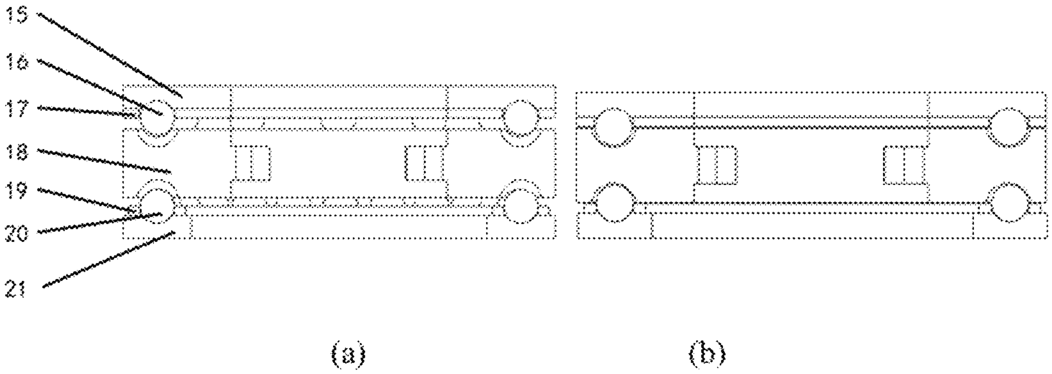
FIG. 4 shows a schematic structural diagram of a thrust bearing assembly, where (a) is in a locking state and (b) is in an unlocking process state.
Figure 5:
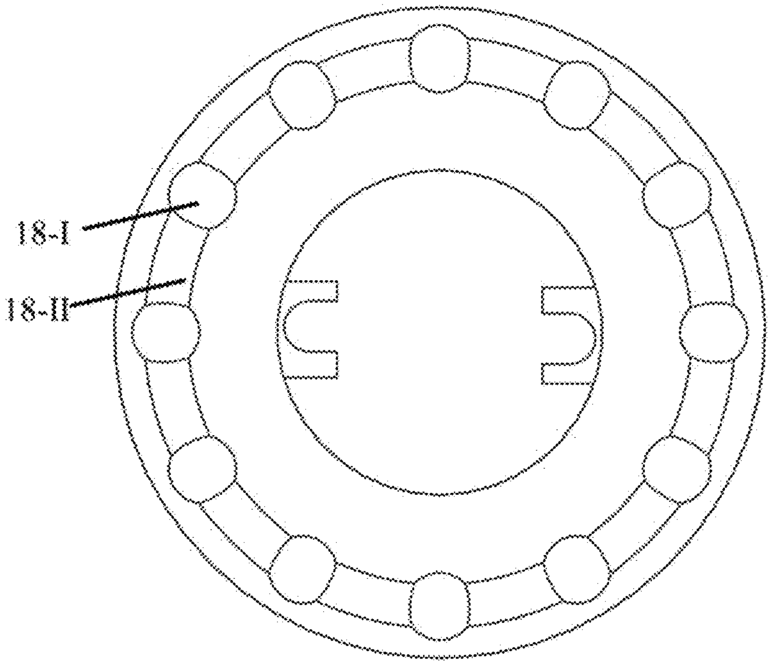
FIG. 5 shows a schematic structural diagram of deep and shallow grooves in a middle ring of a thrust bearing.

As shown in FIG. 4 and FIG. 5, the present invention draws on the structure of the thrust bearing and improves a ball groove of the middle ring 18 of the thrust bearing into a structure where the deep groove 18-I and the shallow groove 18-II are staggered. The shallow groove can be an original rolling groove, while the deep groove is designed as the pits. When releasing is needed, the middle ring of the thrust bearing rotates by a certain angle under the action of the driving shaft. The upper row of balls 16 and the lower row of balls 20 roll into the deep groove 18-I from the shallow groove 18-II, thereby achieving the release of axial clearance. During automatic resetting, the driving shaft 12 drives the inner ring 18 of the thrust bearing to rotate back to a certain angle. Under the action of the upper cage 17, the balls roll from the deep groove 18-I of the middle ring 18 of the thrust bearing to the shallow groove 18-II, thereby eliminating axial clearance.

Figure 6:
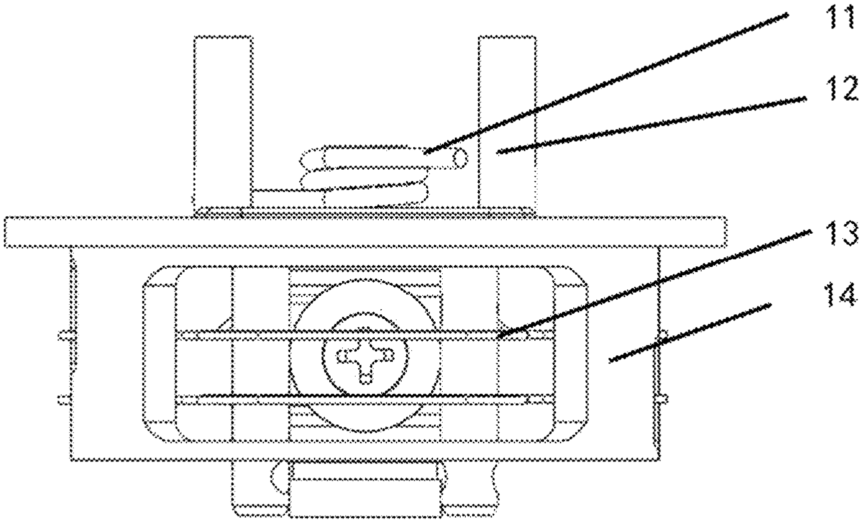
FIG. 6 shows a schematic structural diagram of an SMA driver assembly.
Figure 7:
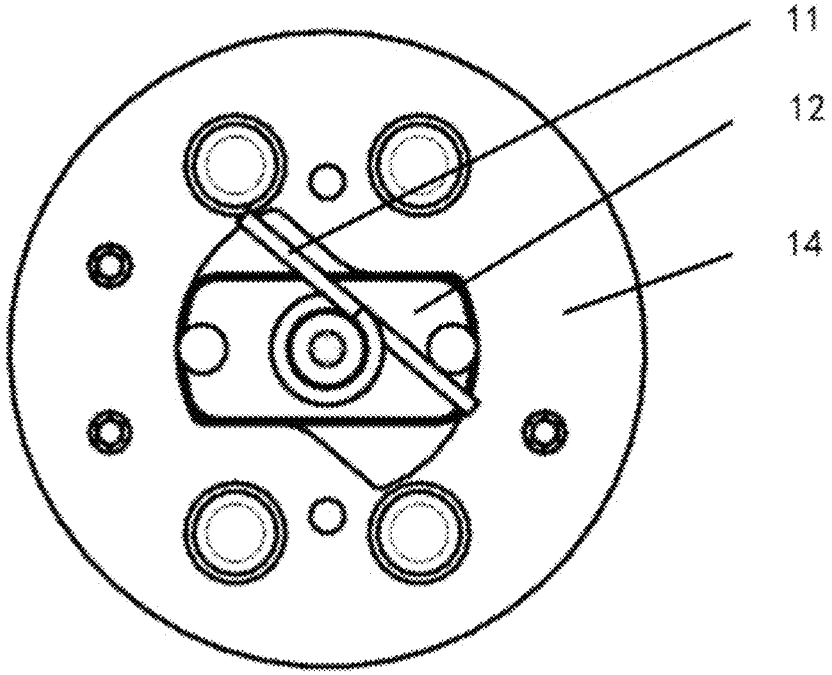
FIG. 7 shows a schematic diagram of mounting of a driving shaft and a support frame.

As shown in FIG. 6 and FIG. 7, the SMA driver assembly consists of the reset spring 11, the driving shaft 12, the SMA wire 13, and the support frame 14. Two ends of two sets of SMA wires 13 are fixed to the support frame and go around the driving shaft 12. The driving shaft 12 is assembled in the groove of the support frame and can rotate by a certain angle.

Figure 8:
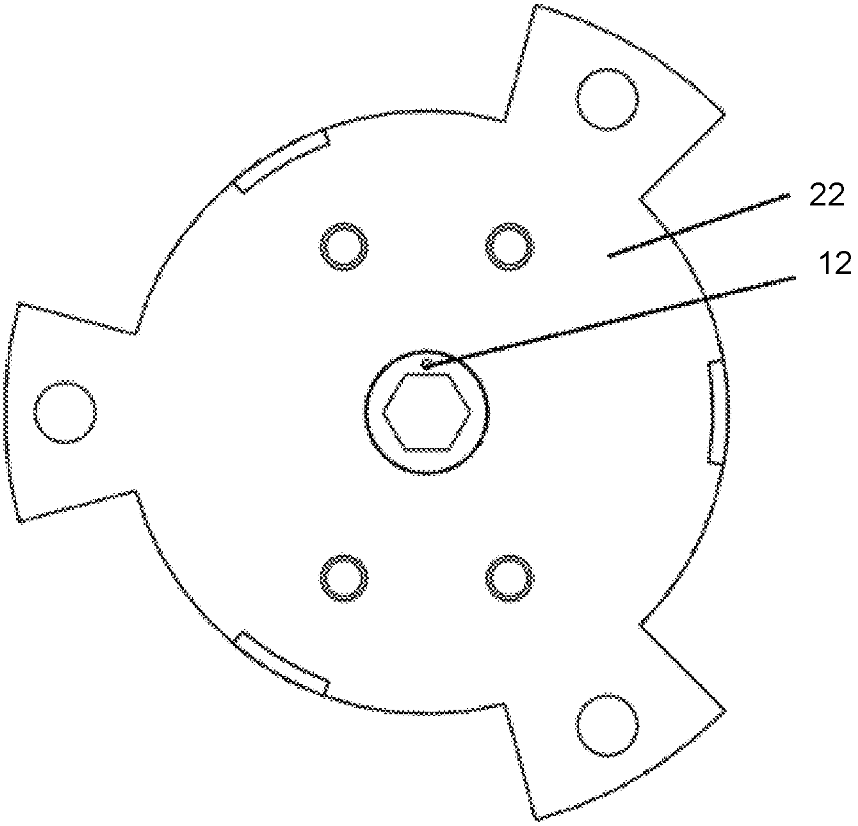
FIG. 8 shows a schematic diagram of a manual unlocking structure of a driving shaft and a shell.

As shown in FIG. 8, a circular hole is formed in the center of the bottom of the bottom cover 22, and an inner hexagonal groove is formed in the bottom of the driving shaft 12. The driving shaft 12 can be manually rotated by means of an internal hexagonal wrench, thereby achieving manual unlocking and resetting.

Apparently, the embodiments described are merely a part rather than all of the embodiments of the present invention. The SMA driver assembly, the thrust bearing assembly, the tray assembly, and the separation assembly all have alternative schemes.

Figure 9:
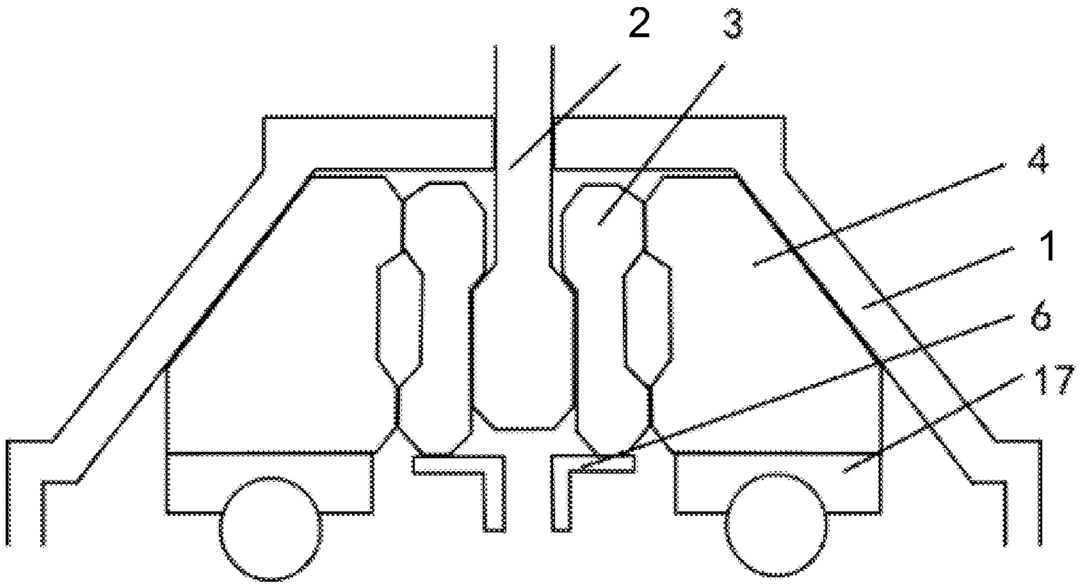
FIG. 9 shows an alternative scheme 1 for a separation assembly.
Figure 10:
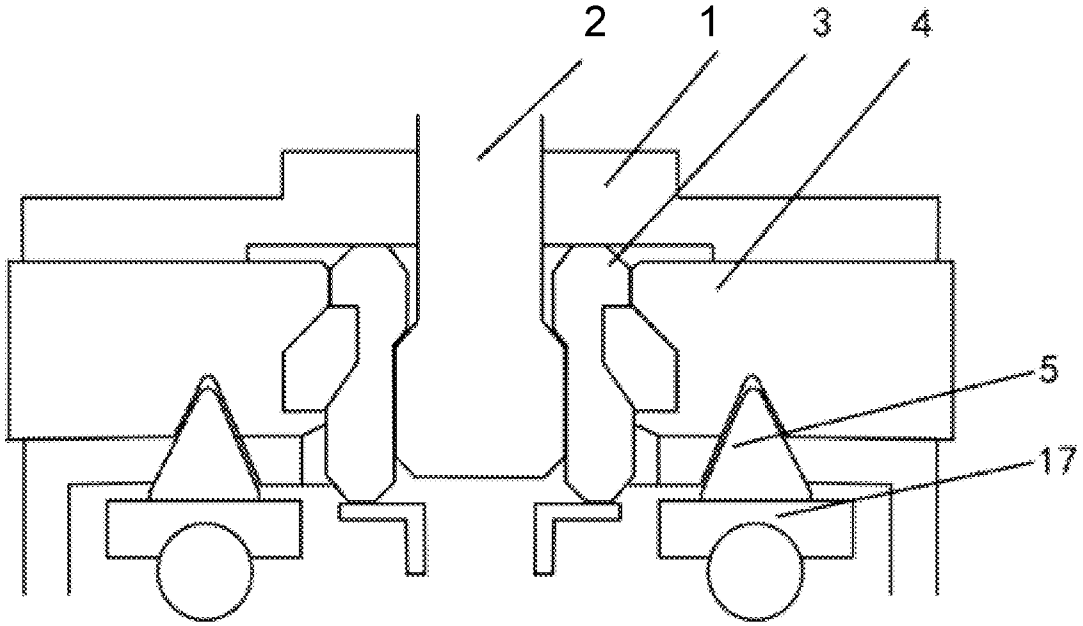
FIG. 10 shows an alternative scheme 2 for a separation assembly.
Figure 11:
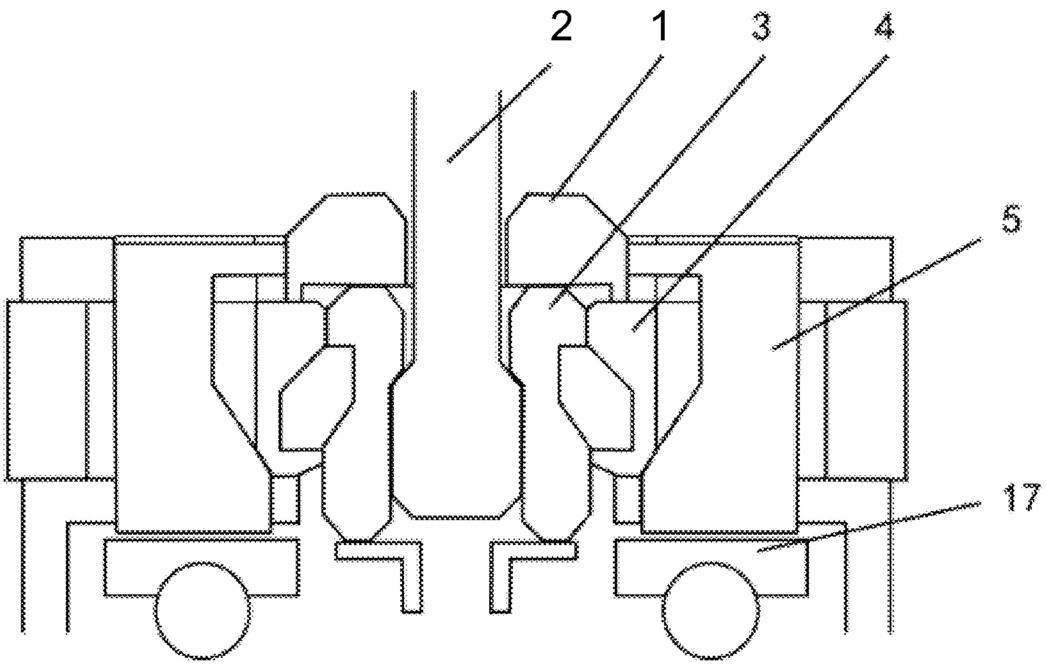
FIG. 11 shows an alternative scheme 3 for a separation assembly.

Taking the separation assembly as an example, three alternative schemes can be proposed. Scheme 1 is shown as FIG. 9, the inclined block 4 and the sliding block 5 are combined into one part, and the shell with the inclined surface is adopted to cooperate with the inclined block, thereby achieving the release of radial constraint in the inclined direction of the inclined block. Scheme 2 is shown as FIG. 10, the sliding block 5 is conical, and the inclined block 4 is changed into four cylindrical sliding blocks. The conical sliding block 5 moves downwards, and the cylindrical sliding block 4 moves outwards to release the hoop petal 3. Scheme 3 is shown as FIG. 11, the sliding block 5 penetrates through the inner part of the inclined block 4, and the inclined surface in the inclined block 4 cooperates with that of the sliding block 5. When the sliding block 5 moves downwards, the inclined block 4 moves outwards to release the hoop petal 3. It should be noted that the above multiple alternative manners are not all implementation examples. Schemes that can be easily thought of by designers in the prior art, such as changing the shape and size of the inclined block and the sliding block, or integrally combining the two parts, should all be within the scope of protection of the present invention.

Figure 12:
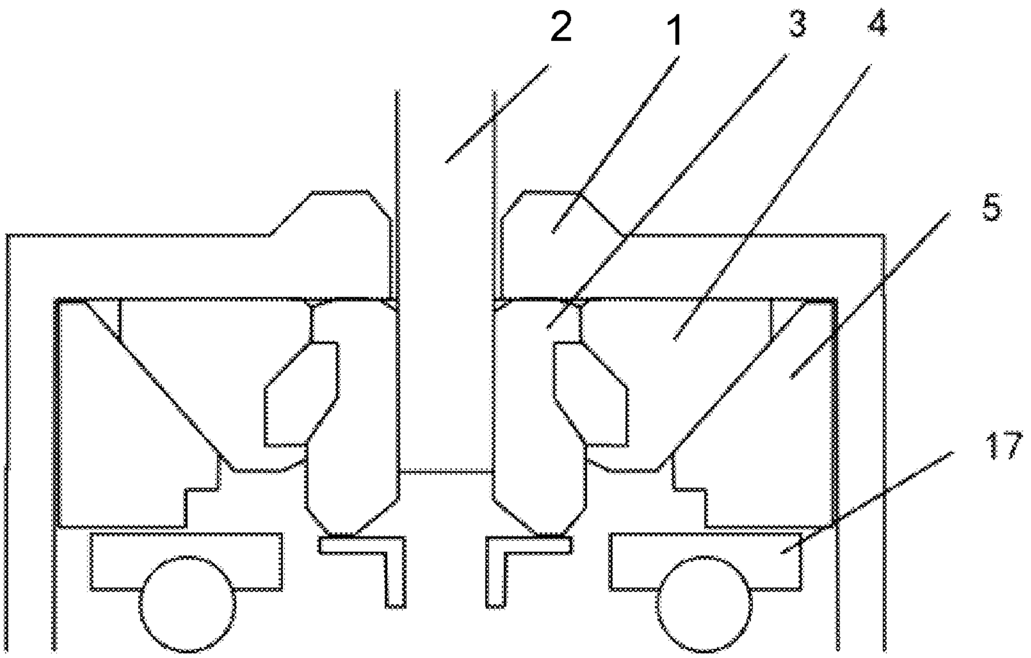
FIG. 12 shows a scheme of replacing a plug enclasping connection with a threaded connection.
Figure 13:
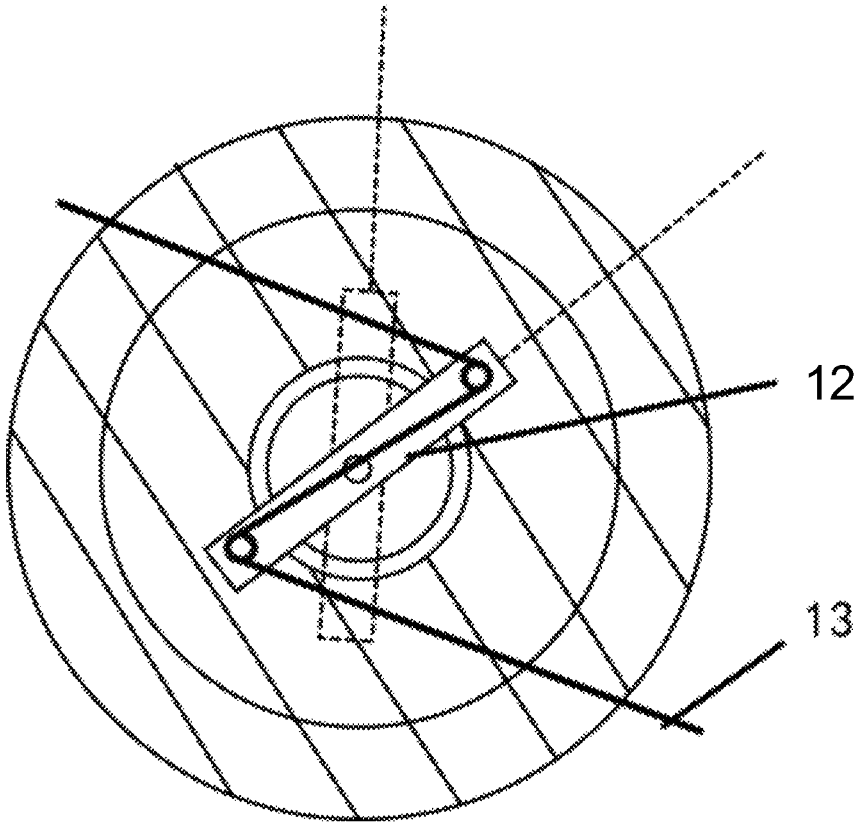
FIG. 13 shows an alternative scheme for mounting of an SMA wire.

The compression rod 2 and a separation structure of the present invention adopt a pluggable connection manner which can be replaced with a threaded connection, as shown in FIG. 12. A mounting manner of the SMA wire of the SMA driver assembly in the present invention is not unique and can be replaced with the mounting manner as shown in FIG. 13. The above changes should also be within the scope of protection of the present invention.

To sum up, the above only describes preferred embodiments of the present invention and is not intended to limit the protection scope thereof. Any modifications, equivalent replacements, improvements, and the like made within the spirit and principle of the present invention shall fall within the protection scope of the present invention.

What is claimed is:

1. A shape memory alloy (SMA) wire-driven reusable release mechanism having a self-resetting function, comprising a shape memory alloy (SMA) driver assembly, a thrust bearing assembly, a tray assembly, and a separation assembly, wherein the SMA driver assembly, the thrust bearing assembly, the tray assembly and the separation assembly are arranged internally and sequentially on a bottom cover (22) and within a shell (1), from a bottom to a top inside the shell (1), wherein the SMA driver assembly comprises a shape memory alloy (SMA) wire (13), a driving shaft (12), a reset spring (11), and a support frame (14); the driving shaft (12) is mounted on the support frame (14); the SMA wire (13) is wrapped around the driving shaft (12) and two ends are fixed to the support frame (14); and an end of the reset spring (11) is mounted on a tray nut (10), and another end of the reset spring (11) is mounted on the driving shaft (12);

the thrust bearing assembly is pressed onto the support frame (14) and connected to the driving shaft (12); and pits are uniformly formed in a raceway of the thrust bearing assembly;

the tray assembly comprises a tray (6), a tray spring (7), a tray shaft (8), a tray bracket (9), and the tray nut (10), wherein the tray bracket (9) is mounted on the support frame (14); the tray (6) is mounted on the tray bracket (9) through the tray shaft (8) and the tray nut (10); and the tray spring (7) is wrapped around the tray shaft (8) and located between the tray (6) and the tray bracket (9); and the separation assembly comprises a compression rod (2), a hoop petal (3), and an inclined block (4), wherein a protrusion is arranged at one end of the compression rod (2), and the protrusion of the compression rod (2) is inserted into the hoop petal (3) and surrounded by the hoop petal (3); an upper end and a lower end of the hoop petal (3) are respectively in contact with the shell (1) and the tray (6); the inclined block (4) is located between the hoop petal (3) and the shell (1) and moves up and down along an inclined surface of the inclined block (4); and the hoop petal (3) and the inclined block (4) both include symmetrical grooves in a contact surface.

2. The SMA wire-driven reusable release mechanism according to claim 1, wherein the thrust bearing assembly is of a double-column structure, and sequentially comprises an upper ring (15), an upper row of balls (16), an upper cage (17), a middle ring (18), a lower cage (19), a lower row of balls (20), and a lower ring (21) from the top to the bottom within the shell (1), wherein the lower ring (21) of a thrust bearing is pressed onto the support frame (14), and the middle ring (18) is connected to the driving shaft (12); and the middle ring (18) comprises the raceway, and the pits are formed in the raceway of the middle ring (18) and are evenly spaced from the raceway.

3. The SMA wire-driven reusable release mechanism according to claim 1, wherein the thrust bearing assembly comprises balls, and the balls of the thrust bearing assembly are coated with a molybdenum disulfide lubricating coating.

4. The SMA wire-driven reusable release mechanism according to claim 1, wherein an upper portion of the top of the shell (1) is narrower than a lower portion of the top of the shell (1), a side surface of the shell (1) is inclined, and the shell cooperates with an inclined surface of the inclined block (4); and the inclined block (4) slides up and down along the side surface of the shell (1).

5. The SMA wire-driven reusable release mechanism according to claim 1, wherein the separation assembly further comprises a sliding block (5), the sliding block (5) is mounted on an upper end surface of the thrust bearing assembly, the sliding block (5) is provided with an inclined surface which cooperates with the inclined block (4), and the inclined block (4) slides up and down along the inclined surface of the sliding block (5).

6. The SMA wire-driven reusable release mechanism according to claim 5, wherein the sliding block (5) is conical, and the inclined surface of the inclined block (4) is formed at a bottom of the inclined block (4) and cooperates with the sliding block (5).

7. The SMA wire-driven reusable release mechanism according to claim 5, wherein the sliding block (5) penetrates through the inclined block (4).

8. The SMA wire-driven reusable release mechanism according to claim 1, wherein a circular hole is formed in a center of a bottom of the bottom cover (22), and an inner hexagonal groove is formed in a bottom of the driving shaft (12) for manual rotation of the driving shaft (12).

9. The SMA wire-driven reusable release mechanism according to claim 1, wherein a protrusion is arranged on a side surface of the thrust bearing assembly, and corresponding grooves are formed in a side surface of the bottom cover (22) for manual unlocking and resetting.

* * * * *